(12) United States Patent
Kohno

(10) Patent No.: US 7,130,065 B2
(45) Date of Patent: Oct. 31, 2006

(54) PRINTING APPARATUS, METHOD OF CONTROLLING SAME, INFORMATION PROCESSOR CONNECTED THERETO, SYSTEM AND STORAGE MEDIUM

(75) Inventor: Tetsushi Kohno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/215,031

(22) Filed: Aug. 9, 2002

(65) Prior Publication Data

US 2002/0191217 A1 Dec. 19, 2002

Related U.S. Application Data

(62) Division of application No. 09/059,264, filed on Apr. 14, 1998, now Pat. No. 6,473,191.

(30) Foreign Application Priority Data

Apr. 23, 1997 (JP) .................................. 9-106043
Mar. 25, 1998 (JP) .................................. 10-077727

(51) Int. Cl.
G06F 3/12 (2006.01)
G06F 15/00 (2006.01)
(52) U.S. Cl. .................................... 358/1.13; 358/1.15
(58) Field of Classification Search ................. 358/1.1, 358/1.13, 1.15, 1.14
See application file for complete search history.

(56) References Cited

U.S. PATENT DOCUMENTS

| | | | |
|---|---|---|---|
| 5,363,134 A | 11/1994 | Barbehenn et al. | 347/49 |
| 5,570,201 A | 10/1996 | Yokota | 358/404 |
| 5,592,593 A | 1/1997 | Speed | 395/110 |
| 5,627,572 A | 5/1997 | Harrington, III et al. | 347/23 |
| 5,742,742 A | 4/1998 | Ueda | 395/109 |
| 5,847,722 A | 12/1998 | Hackleman | 347/19 |
| 5,877,798 A | 3/1999 | Clarke et al. | 347/250 |
| 5,887,990 A | 3/1999 | Card et al. | 400/61 |
| 5,900,888 A | 5/1999 | Kurosawa | 347/7 |
| 5,924,802 A | 7/1999 | Sakurai | 400/61 |
| 6,031,621 A | 2/2000 | Binder | 358/1.1 |
| 6,195,171 B1 | 2/2001 | Ochiai | 358/1.15 |

Primary Examiner—Douglas Q. Tran
(74) Attorney, Agent, or Firm—Fitzpatrick, Cella, Harper & Scinto

(57) ABSTRACT

Disclosed is a readily expandable printing apparatus which, despite having only a small memory capacity, is applicable to a number of types of printing processing. On the basis of the type of ink cartridge loaded in the printing apparatus and the content of information that is to be printed, a host computer retrieves from its own memory a program to be run in the printing apparatus. The host computer then transfers the retrieved program to the printing apparatus. The later stores the transferred program in an internal RAM and, when print data has been transferred from the host computer, executes the program.

15 Claims, 13 Drawing Sheets

FIG. 9

| | | TEXT PROGRAM | COLOR PROGRAM | GRAYSCALE PROGRAM |
|---|---|---|---|---|
| PRINTER_A | CARTRIDGE 001 | XXXXX | XXXXX | XXXXX |
| PRINTER_A | CARTRIDGE 002 | XXXXX | XXXXX | XXXXX |
| PRINTER_A | CARTRIDGE 003 | XXXXX | XXXXX | XXXXX |
| PRINTER_A | CARTRIDGE 004 | XXXXX | XXXXX | XXXXX |
| PRINTER_B | CARTRIDGE 001 | XXXXX | XXXXX | XXXXX |
| PRINTER_B | CARTRIDGE 005 | XXXXX | XXXXX | XXXXX |
| ...... | ...... | ...... | ...... | ...... |

PROCESSING PROGRAM DATABASE

FIG. 13

| PROGRAM REGISTRATION |
|---|

PRINTER TYPE : [ PRINTER-A ▽ ]

PROGRAM STORAGE LOCATION [ A : ¥ ]

[ OK ] [ CANCEL ]

PRINTING APPARATUS, METHOD OF CONTROLLING SAME, INFORMATION PROCESSOR CONNECTED THERETO, SYSTEM AND STORAGE MEDIUM

This application is a division of application Ser. No. 09/059,264, filed on Apr. 14, 1998 now U.S. Pat. No. 6,473,191.

BACKGROUND OF THE INVENTION

This invention relates to a printing apparatus, a method of controlling the same, an information processor connected thereto, a method of controlling the information processor, and a related storage medium.

Printers of the kind that discharge liquid ink include those that allow a cartridge of one type (an ink tank or a unit that is a combination of an ink tank and printing head) to be exchanged for another, after which printing is performed in conformity with the particular type of ink cartridge. Examples of such ink cartridges are monochromatic ink cartridges, color ink cartridges and, in some cases, low-density ink cartridges. (Low-density ink cartridges are suitable for forming grayscale images by performing a plurality of printing cycles.)

A variety of printing processing types (printing modes) are available. For example, there are printing modes in which printing is completed by a single pass or by a plurality of passes, and in which printing is performed by moving a carriage in one direction or back and forth in two directions.

Thus, the printing processing that is executed depends not only upon the type of ink cartridge but also upon the combination of cartridge type and printing mode.

According to the prior art, a printer capable of performing printing in a number of printing modes has a memory in which a program for each type of printing processing is stored in advance, and printing is executed by switching among the programs in appropriate fashion. However, a problem with such a printer is higher cost because of the need for a large-capacity memory to store the programs.

Further, since the programs are stored permanently in a ROM or the like, printing processing suited to a new type of ink cartridge cannot be executed.

SUMMARY OF THE INVENTION

Accordingly, an object of the present invention is to provide a readily expandable printing apparatus capable of being applied to a number of types of printing processing despite having only a small memory capacity, an information processor connected to this apparatus, a method of controlling the information processor and a related printing medium.

According to the present invention, the foregoing object is attained by providing a printing apparatus for printing an image using prescribed printing means based upon print data that has been transferred from a host, comprising storage means for storing, in a prescribed memory, a processing program that has been transferred from the host, and control means for causing the print data to be processed in accordance with a processing program, which has been stored by the storage means, if the print data has been transferred from the host.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a diagram illustrating the content of the database of a processing program managed on the side of a host computer according to the embodiments of the present invention;

FIG. 13 is a diagram illustrating an example of a display for registering a program in a host computer.

DESCRIPTION OF THE PREFERRED EMBODIMENTS

Embodiments of the present invention will be described in detail with reference to the accompanying drawings.

Figure 1:
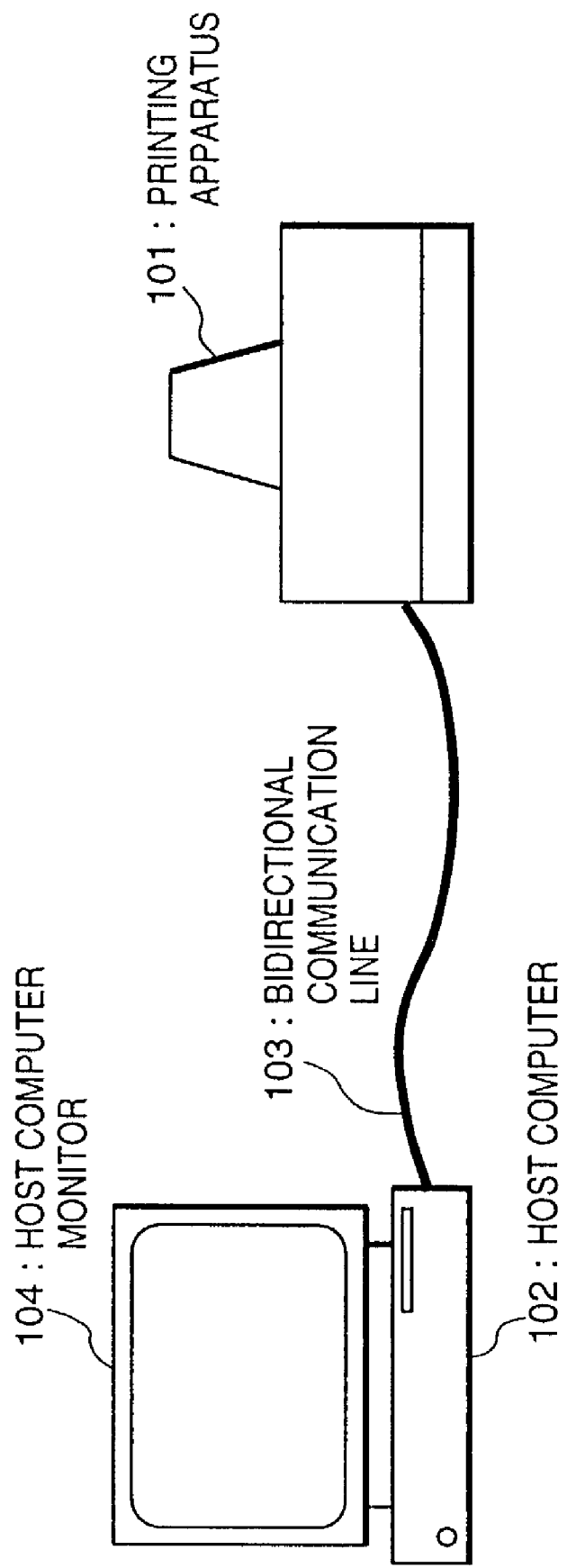
FIG. 1 is a diagram showing the basic arrangement of a printing system according to embodiments of the present invention.

FIG. 1 is a diagram showing the arrangement of a printing system according to embodiments of the present invention. The system includes a printing apparatus 101 and a host computer (which includes a monitor 104) 102. The printing apparatus 101 and host computer 102 are connected by a bidirectional communication cable 103.

The host computer 102 may be a general-purpose computer such as a personal computer or work station. The cable 103 is connected to bidirectional communication interfaces of the printing apparatus 101 and host computer 102. (An example of these interfaces is the bidirectional Centronics interface, which is a functional extension of the interface developed by Centronics Corporation.)

Figure 2:
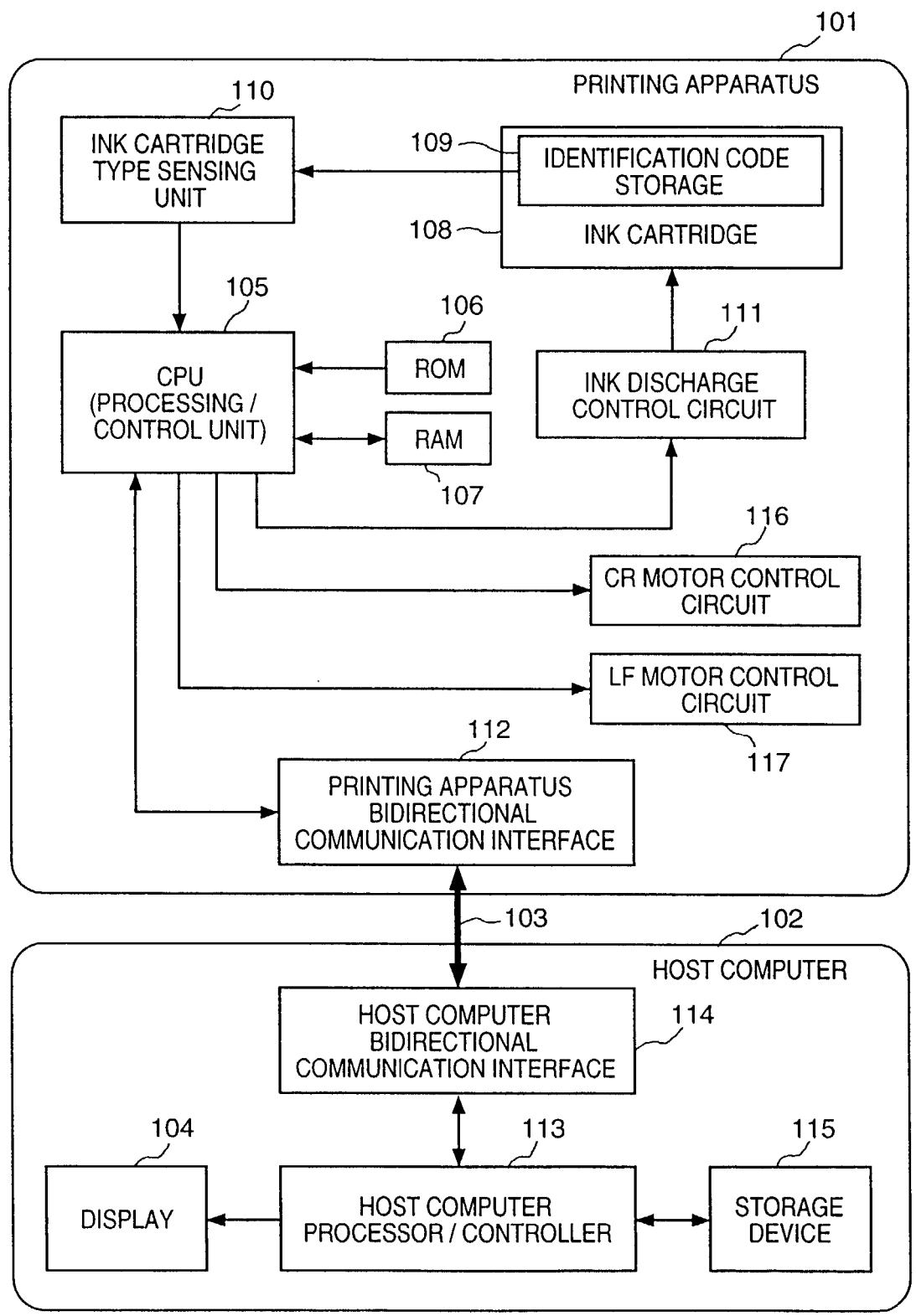
FIG. 2 is a block diagram of a printing system according to a first embodiment of the present invention.
Figure 3:
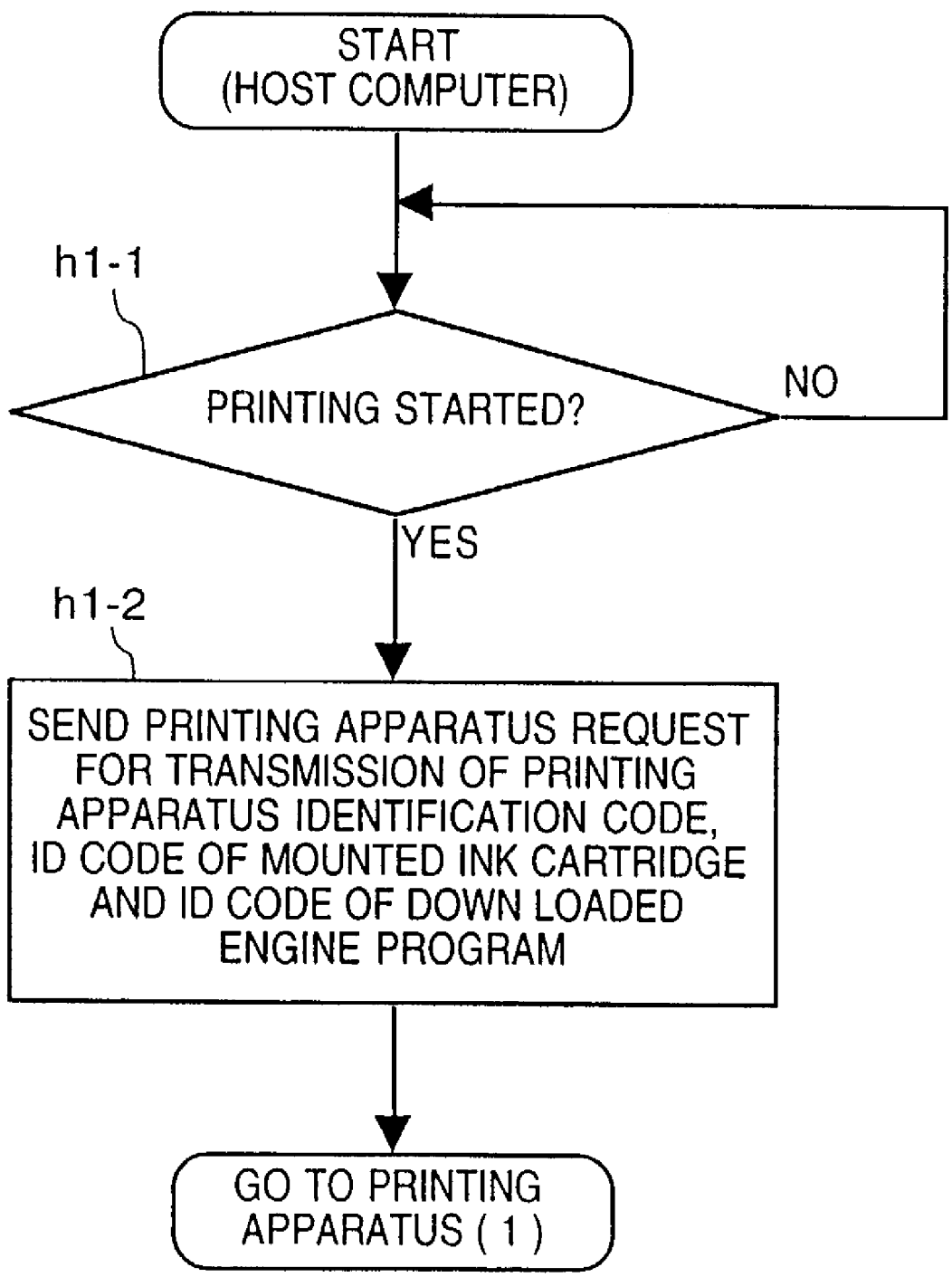
FIG. 3 is a flowchart illustrating the procedure of an operation performed on the side of a host computer according to the first embodiment.

FIG. 2 is a block diagram illustrating a printing system according to a first embodiment of the present invention.

The printing apparatus 101 comprises a main unit and an ink cartridge section 108 which includes a model code memory 109 in which the type of ink cartridge is recorded. The main unit of the printing apparatus 101 includes a control processing unit (a CPU) 105 for processing print data and controlling the printing apparatus; information storing means (a ROM) 106 in which only basic software for controlling the power supply of the printing apparatus as well as communication with the apparatus and a code indicative of the type of printing apparatus are stored in advance; information storing means (a RAM) 107 for temporarily storing various results of processing, receiving and buffering print data that has been transmitted from the host computer 102, and storing printing apparatus drive control software received from the host computer 102; an ink-cartridge type sensing unit 110 for sensing the type of ink cartridge; an ink discharge control circuit 111 for driving and controlling nozzles provided in an ink cartridge; a printing apparatus bidirectional communication interface 112 for inputting and outputting information to and from the host computer 102; a carriage (CR) motor control circuit 116 for moving a carriage, on which an ink cartridge has been mounted, back and forth; and a paper line-feed (LF) motor control circuit 117 for transporting printing paper.

Though it will depend upon the specifications of the particular ink cartridge, the ink-cartridge type sensing unit 110 may be constituted by any means so long as it is capable of sensing the type of ink cartridge electrically or optically.

According to this embodiment, a freely replaceable ink cartridge (a combination of a printing head and ink tank) is provided not only with a plurality of electrodes for receiving printing drive signals but also a plurality of electrodes which output information indicating the type of ink cartridge.

The host computer 102 includes a processor/controller (CPU) 113 for administering overall control of the apparatus; a display unit 104; a storage device 115 for storing the printer driver programs of this embodiment as well as the operating system and various applications; and an interface 114 for communicating with the printing apparatus 101. As set forth above, the host computer 102 according to this embodiment is contemplated as being a general-purpose computer. Accordingly, the host computer 102 naturally is equipped with a keyboard and pointing device, a RAM serving as a memory device and an external storage device, etc. It should be noted that the host computer 102 is not limited to a general-purpose computer but may be a device such as a word processor as a matter of course.

Figure 10:
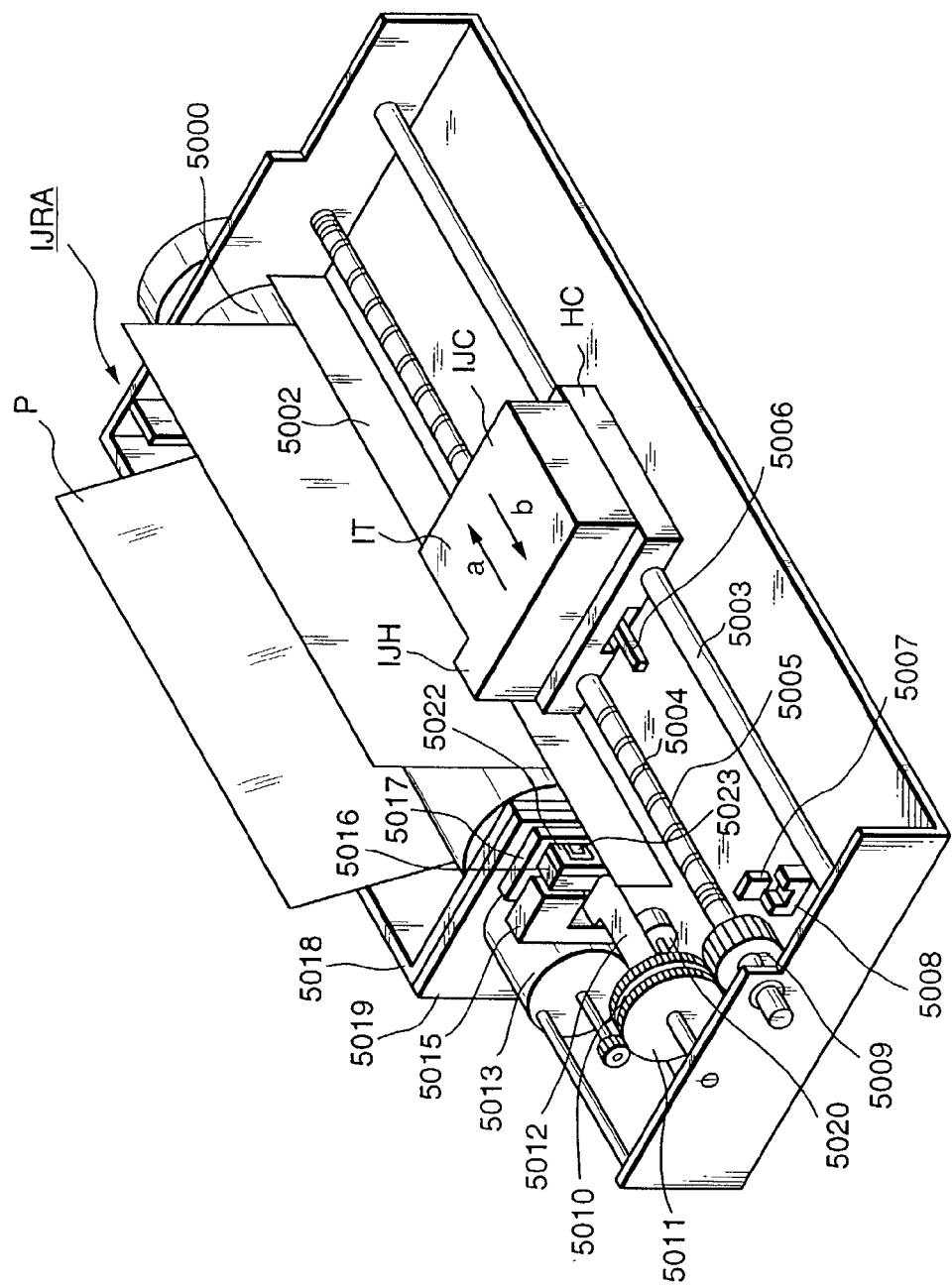
FIG. 10 is a perspective view showing the mechanism of a printing apparatus according to the embodiments.

FIG. 10 is a perspective view showing a printing mechanism in accordance with this embodiment.

As shown in FIG. 10, a carriage HC is engaged with a helical groove 5004 of a lead screw 5005 rotated via driving force transmission gears 5011, 5009 in operative association with the forward and reverse rotation of a carriage motor 5013 (driven by the carriage motor control circuit 116). The carriage HC has a pin (not shown) moved back and forth in directions of arrows a and b. An ink-jet cartridge IJC is mounted on the carriage HC. Electrodes (not shown) for connection to electrodes provided on the surface of the ink cartridge IJC are provided. A paper retaining plate 5002 presses printing paper P against a platen 5000 along the traveling direction of the carriage. Photocouplers 5007, 5008 constitute home position sensing means for verifying the presence of a carriage lever 5006 in the vicinity of the photocouplers and changing over the direction in which the motor 5013 is rotated. A member 5016 supports a cap member 5022, which is for capping the front side of the printing head. Suction means 5015 for applying suction to the cap subjects the cap to suction recovery via an opening 5023 inside the cap. A member 5019 makes it possible to move a cleaning blade 5017 back and forth. The cleaning blade 5017 and the member 5019 are supported on a support plate 5018. It goes without saying that the blade need not be of this type and that a well-known cleaning blade can be applied to this embodiment. A lever 5021, which is for starting the suction of the suction recovery operation, moves with movement of a cam 5020 engaged with the carriage. Movement is controlled by well-known transmission means whereby the driving force from the driver motor is changed over as by a clutch.

It is so arranged that the capping, cleaning and suction recovery operations are performed at the corresponding positions by the action of the lead screw 5005 when the carriage arrives in an area on the home-position side. However, if it is so arranged that the desired operations are performed at well-known timings, this arrangement can also be applied to this embodiment. Furthermore, the line-feed motor for rotating the platen 5000 and the like is not visible in FIG. 10 as it is hidden from view.

Figure 11B:
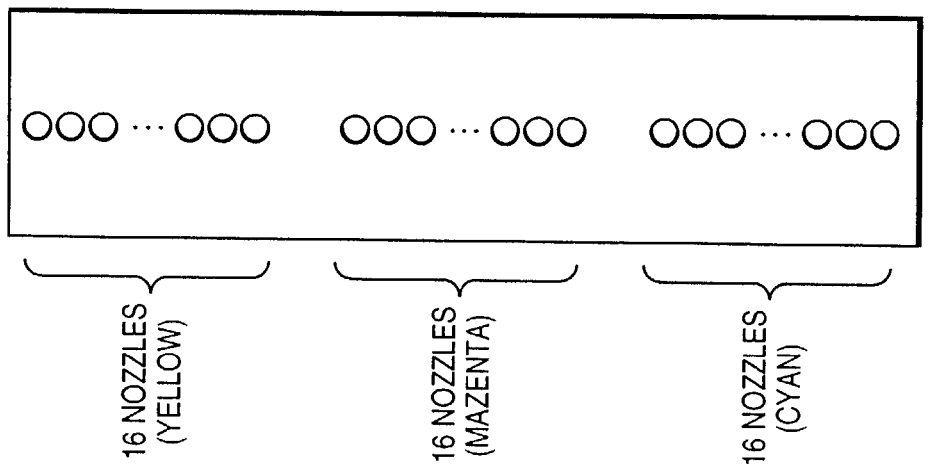
FIGS. 11A, 11B are diagrams showing the head portions of ink-jet cartridges.
Figure 11A:
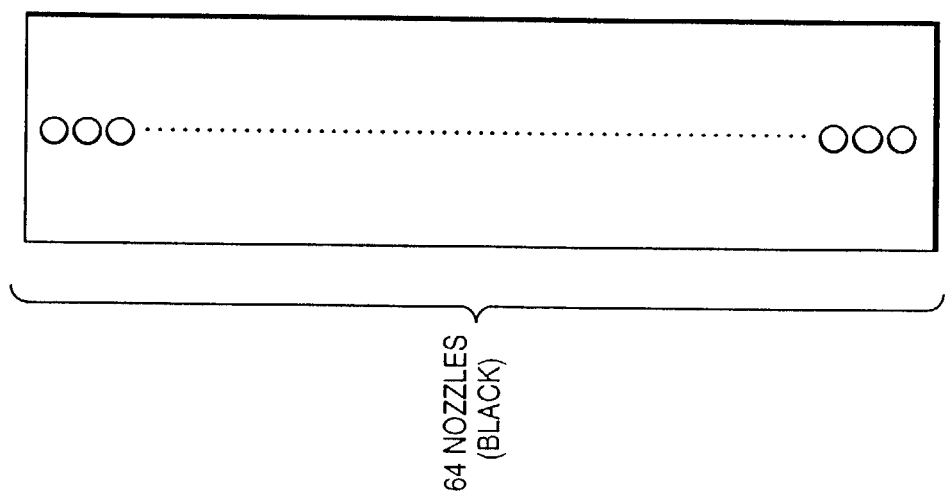

FIGS. 11A and 11B illustrate examples of the printing head portions of an ink-jet cartridge capable of being mounted on the ink-jet carriage IJC according to this embodiment. According to the embodiment, it is possible to mount a black ink-jet cartridge which, as shown in FIG. 11A, has a single longitudinal row of 64 nozzles, or a three-color (yellow, magenta, cyan) ink-jet cartridge which, as shown in FIG. 11B, has 16 longitudinally arrayed nozzles for each of the three colors. Ink-jet cartridges of types other than these can be mounted as a matter of course. Regardless of the type of ink-jet cartridge used, the cartridge will have a group of electrodes for being connected to a group of electrodes provided on the ink-jet carriage IJC. Several of these electrodes are used to identify the type of cartridge.

With the single-color (black) ink-jet cartridge shown in FIG. 11A, the width of a band printed by a single scan of the carriage IJC is comparatively large. As a result, the length of the printing paper transported for a single scan also is comparatively large. This means that processing for printing one page can be executed at high speed. With the ink-jet cartridge of FIG. 11B, on the other hand, the printing paper is transported by length per scan commensurate with 16 nozzles and, as a consequence, the time needed to complete the printing of one page is lengthened correspondingly. However, color printing is possible. In any case, the processing executed within the printing apparatus 101 differs depending upon the type of ink cartridge.

Operation in regard to printing processing executed in the system of the embodiment set forth above will now be described.

As described above, the ROM 106 within the printing apparatus 101 of this embodiment stores only basic software for controlling the power supply of the printing apparatus, communication with the apparatus and a code indicative of the type of printing apparatus. This means that the apparatus is incapable of analyzing and printing print data using this information and data alone.

Accordingly, this embodiment of the invention is so adapted that before the host computer 102 outputs print data to the printing apparatus 101, the host computer sends the printing apparatus 101 a prescribed command to inquire about the status of the printing apparatus. Upon receiving the command, the printing apparatus 101 (or more specifically, the CPU 105 serving as the processing and control means) responds to the inquiry by sensing the type of mounted ink cartridge via the ink-cartridge type sensing unit 110, extracts the model type of the printing apparatus stored in the ROM 106 as well as information specifying the printing processing program currently stored in the RAM 107, and transmits the type of ink cartridge, the apparatus model information and the information specifying the processing program to the host computer 102 in a suitable format via the bidirectional interface. If a processing program does not presently exist in the memory, the printing apparatus 101 so notifies the host computer 102.

Upon receiving this information, the host computer 102 (or, more specifically, the CPU 113 for processing and control), in conformity with the type of ink cartridge and type of printing apparatus and in dependence upon the content of information to be printed (e.g., text only, text with color images, etc.), transfers the corresponding program from among the plurality of programs that have been stored in the storage device 115 to the printing apparatus 101. If a processing program already exists on the side of the printing apparatus 101 and can be used as is, the host computer 102 need not transfer a program to the printing apparatus 101.

If a processing program has been transferred to the printing apparatus 101, the printing apparatus 101 stores the program codes in the RAM 107. If another program exists in the printing apparatus 101 at this time, the printing apparatus 101 frees the area in which the program has been stored, clears the information specifying the stored program, loads the newly received from in the RAM 107 and updates the information specifying this program. When the storage of all program codes has been completed, processing shifts to the program that has just been stored in the RAM 107.

From this point onward, the printing apparatus 101 (CPU 105), in accordance with the downloaded program, receives print data (image data) from the host computer 102, outputs control signals to the CR motor control circuit 116, LF motor control circuit 117 and ink discharge control circuit 111 and executes printing of the received image data.

The details of the procedure of processing in accordance with the overview given above will now be described with reference to FIGS. 3 through 7.

If the user has selected the printing mode and print image and issued an instruction to start printing (step h1-1 in FIG. 3), the host computer 102 sends the connected printing apparatus 101 a signal requesting transmission of the printing apparatus model code, the code indicating the type of ink cartridge that has been loaded in the printing apparatus and the code identifying the engine program, which is for driving and controlling the printing apparatus 101, currently downloaded in the printing apparatus 101 (step h1-2).

Figure 4:
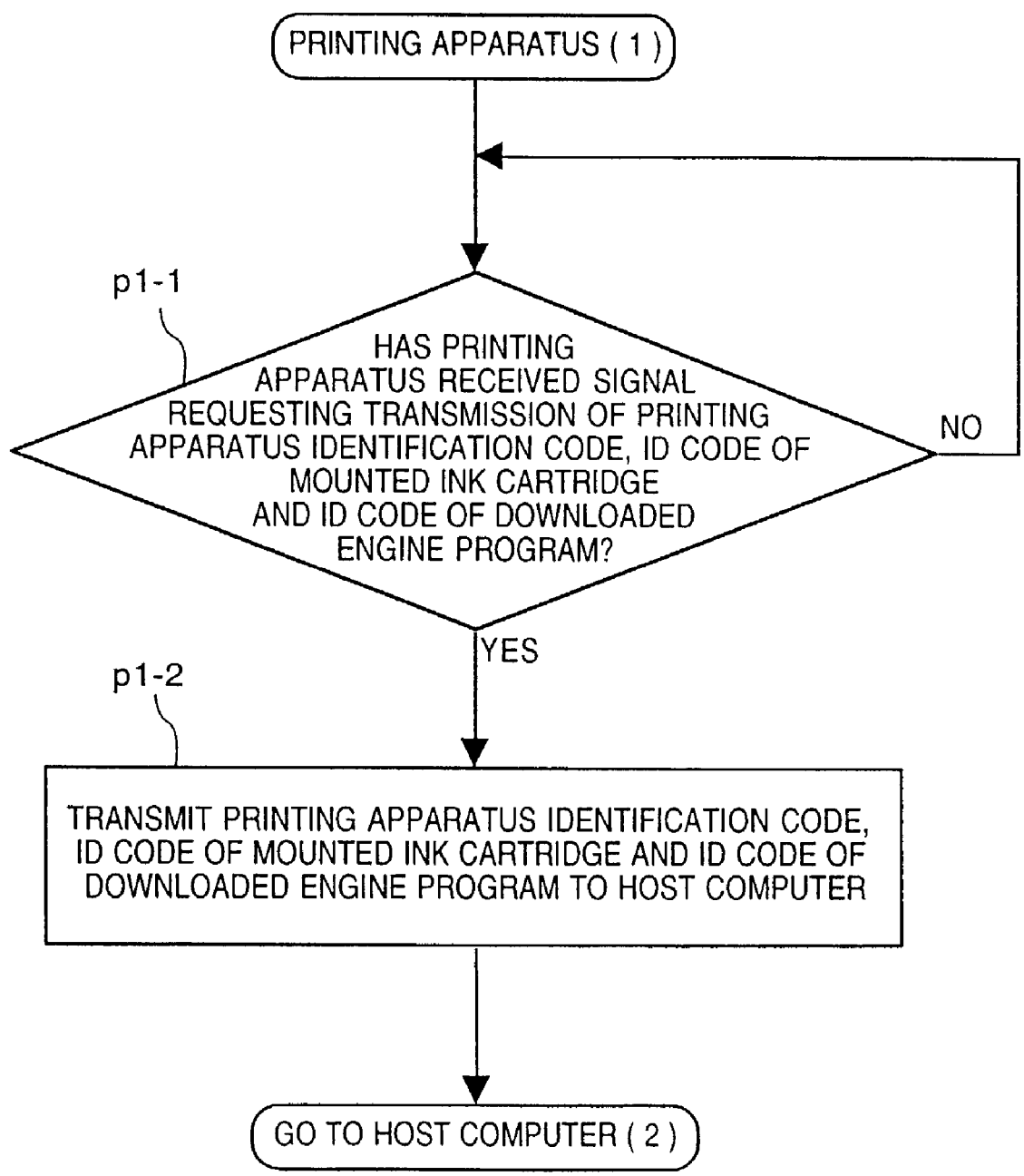
FIG. 4 is a flowchart illustrating the procedure of an operation performed on the side of the printing apparatus according to the first embodiment.

Upon receiving the request signal, the printing apparatus 101 performs an operation in accordance with the flowchart of FIG. 4. More specifically, upon comprehending the inquiry at step p1-1 in FIG. 4, the printing apparatus 101 transmits the printing apparatus model code, the code indicating the type of ink cartridge that has been loaded in the printing apparatus and the code identifying the downloaded engine program to the host computer 102 in a predetermined format (step p1-2).

Figure 5:
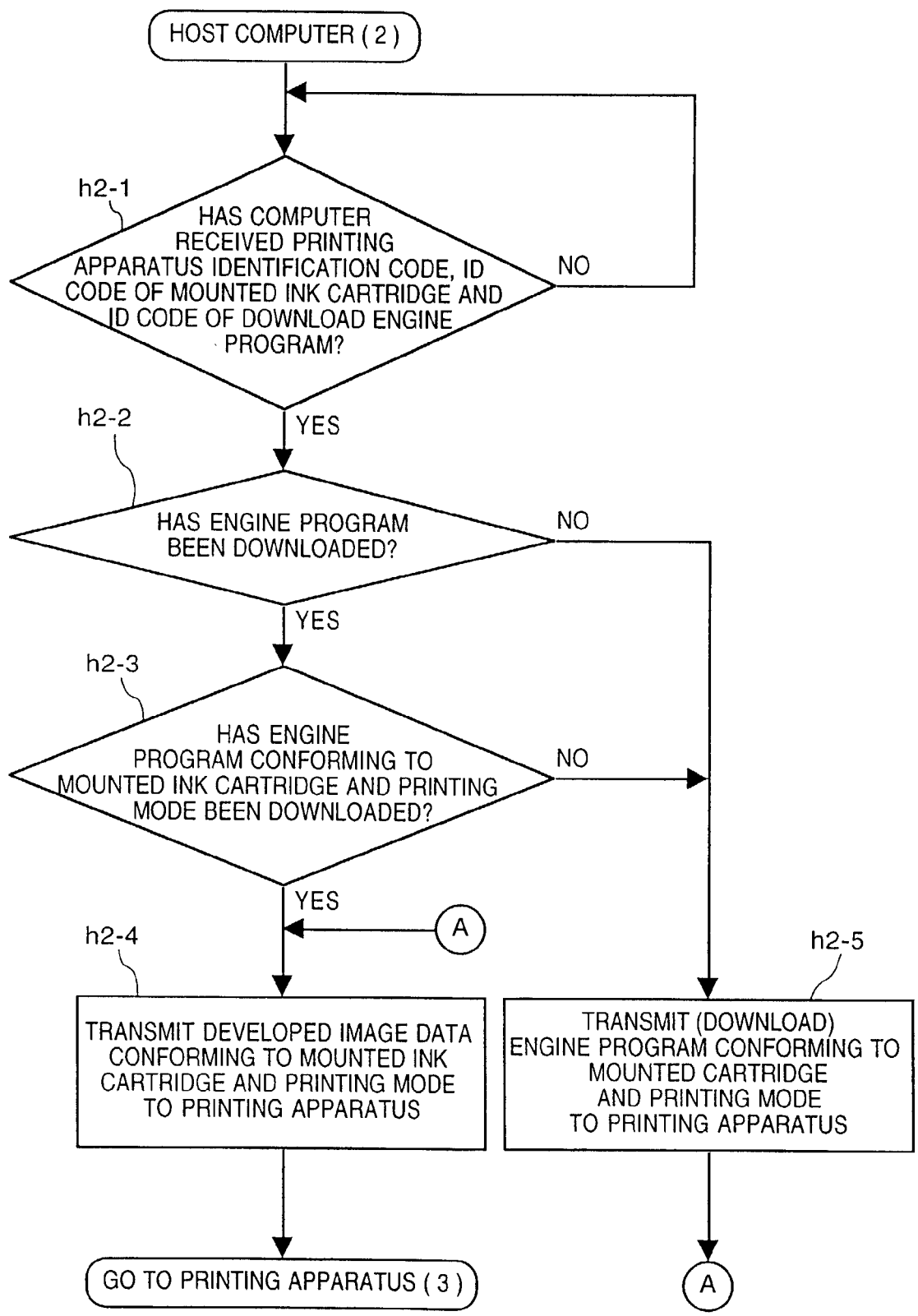
FIG. 5 is a flowchart illustrating the procedure of an operation performed on the side of a host computer according to the first embodiment.

The processing executed on the side of the host computer will now be described in accordance with the flowchart of FIG. 5.

Upon receiving the signal sent from the printing apparatus 101 (step 2-1), the host computer 102 determines whether a processing program already exists on the side of the printing apparatus 101 (step h2-2).

If it is determined that a processing program already exists on the side of the printing apparatus 101, the host computer 102 determines whether this processing program is suitable for the type of ink cartridge loaded in the printing apparatus 101 and for the printing mode of the image that is to be printed (step h2-3).

If it is judged that a suitable processing program already exists in the printing apparatus 101, then processing proceeds to step h2-4, where the host computer 102 outputs the image suited to the loaded ink cartridge and printing mode to the printing apparatus 101, whereby the image is printed.

If a processing program does not exist in the printing apparatus 101, or if one exists but it is not appropriate, then the program proceeds to step h2-5. Here the host computer 102 retrieves the proper processing program from the memory device 115 and transfers it to the printing apparatus 101. Processing then proceeds to step h2-4, at which the print data is transferred to the printing apparatus 101.

Figure 6:
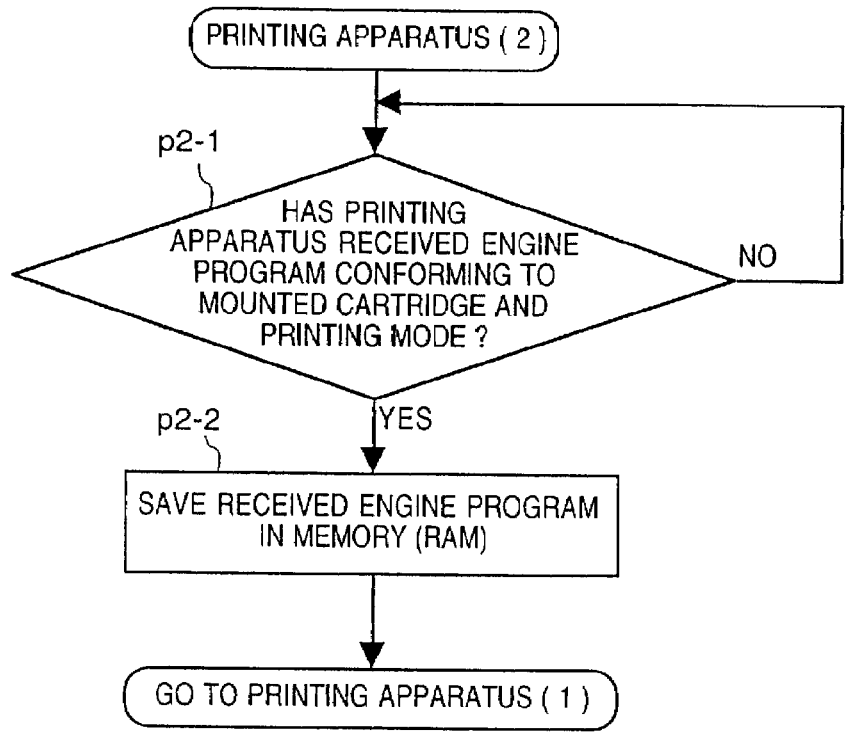
FIG. 6 is a flowchart illustrating the procedure of an operation performed on the side of the printing apparatus according to the first embodiment.

Processing executed on the side of the printing apparatus 101 is shown in FIG. 6. If it is determined at step p2-1 of this flowchart that a processing program has been downloaded, the program proceeds to step p2-2. Here the processing program that has been downloaded is saved in the RAM 107.

Figure 7:
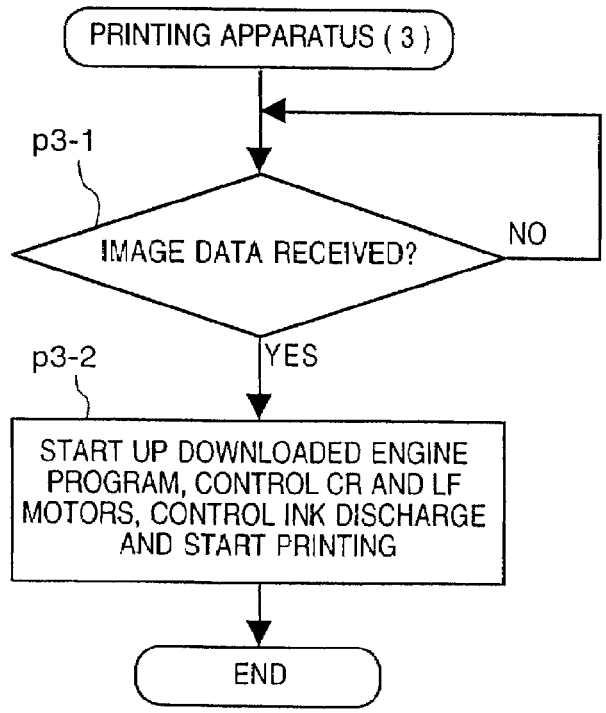
FIG. 7 is a flowchart illustrating the procedure of an operation performed on the side of the printing apparatus according to the first embodiment.

Processing based upon print data is executed in accordance with the flowchart of FIG. 7. Specifically, upon receiving image data to be printed (step p3-1), the printing apparatus 101 starts up the already downloaded processing program and controls the carriage motor, the paper linefeed motor and the jetting of ink, thereby executing the printing of transferred image data (step p3-2).

With regard to an example of a method of deciding the processing program transferred to the printing apparatus 101, a table (or database) of the kind shown in FIG. 9 is stored in the memory device 115 of the host computer 102 and the processing program is specified by referring to the table.

Since model information specific to the printing apparatus 101 is transferred from the printing apparatus to the host computer 102, the processing programs are first narrowed down depending upon the model information (Printer A, Printer B, . . . , in the example of FIG. 9). Next, processing programs that match the type of mounted cartridge are specified. As a result, one line of the table shown in FIG. 9 can be specified. Next, whether the processing program is to be for printing text, color or grayscale is determined in accordance with the content of the information that is to be printed. Then, in accordance with pointers (addresses) that have been stored in the respective cells of the table, the proper processing program is fetched from a separately provided processing program database and the fetched program is transferred to the printing apparatus 101.

It should be noted that "xxxxx" in the table of FIG. 9 corresponds to the pointer (address or file name) of the respective program. Naturally there are cases where the pointers differ. Further, if a cartridge "001", for example, is a monochromatic ink cartridge but the information to be printed is color information, it goes without saying that color cannot be printed. When a color image is received, however, a processing program which will execute the appropriate processing (conversion processing) and print the data in black and white will be allocated.

Thus, in accordance with the first embodiment as described above, the memory on the side of the printing apparatus need only be of minimal storage capacity. Moreover, processing suitable for a number of ink cartridges and a variety of print information can be executed despite the small capacity of the memory.

Furthermore, any type of ink cartridge can be used so long as it is an ink-jet cartridge capable of being mounted on the carriage in the printing section. For example, the printing apparatus will be capable of supporting future ink-jet cartridges provided with a printing head having a resolution higher than that currently available. In such case it will be necessary to record the proper program in the host computer.

In the embodiment described above, the command requesting transfer of the status of the printing apparatus 101 is issued when the printing phase is attained, namely when printing execution of printing is instructed by the application running on the host computer. However, the present invention is not limited to such an arrangement. For example, an arrangement may be adopted in which the CPU 105 on the side of the printing apparatus 101 notifies the host computer 102 of information, such as the information of cartridge type obtained via the ink cartridge type sensor 110, when power is introduced to the printing apparatus 101. In such case the host computer would execute processing in accordance with the flowchart of FIG. 4 upon receiving the information.

It is of course permissible to adopt an arrangement in which the status information is sent to the host computer not when power is introduced but when one ink cartridge is exchanged for another.

It should be noted that the printing apparatus 101 in the first embodiment initially operates in accordance with the program in the ROM 106 when power is first introduced. If a processing program is then downloaded from the host computer 102 and print data is actually received, operation shifts to that in accordance with the processing program that has been downloaded. Accordingly, it is necessary to return control to the ROM 106 at an appropriate timing. Though a variety of techniques may be contemplated for achieving this, the simplest is to design all processing programs registered in the host computer 102 to return control to the ROM 106 if a series of printing processing steps has been completed and no print data is received upon elapse of a predetermined period of time. In other words, it is so arranged that in order to start up a processing program from the ROM 106, the leading address of the stored processing program is called. It goes without saying that the invention is not limited to this method and that other methods may also be used.

Figure 8:
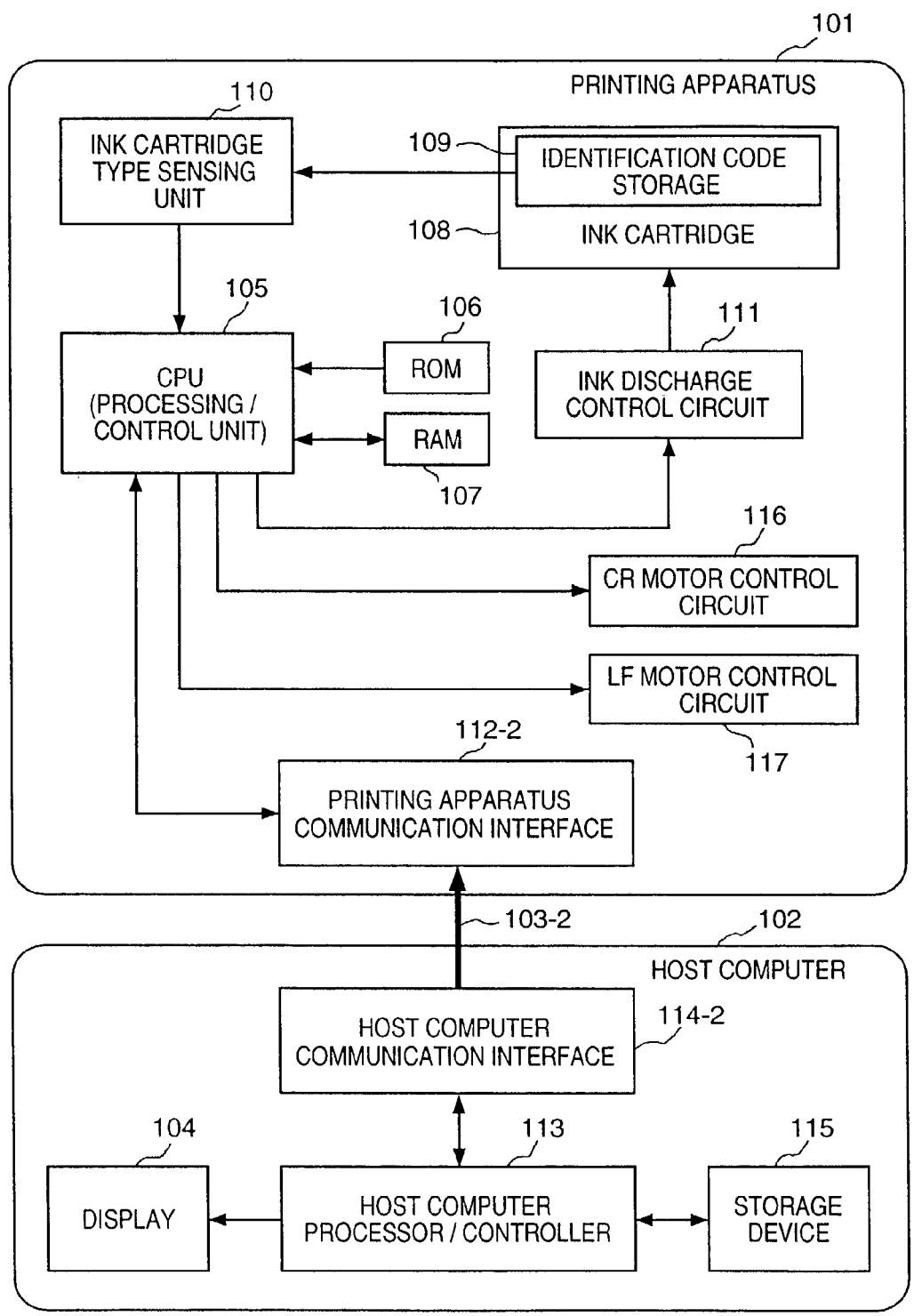
FIG. 8 is a block diagram of a printing system according to a second embodiment of the present invention.

The operation of a second embodiment of the present invention shown in FIG. 8 will now be described.

If the user verifies the type of ink cartridge beforehand, bidirectional communication used in the printing system of the first embodiment will be unnecessary and it will suffice to employ a unidirectional communication interface capable of performing communication from the host computer to the printing apparatus. In such case image data is sent from the host computer to the printing apparatus along with the processing program suitable for printing of the image. The printing apparatus that has received this data and information saves the transferred processing program in its memory, until the end of the processing program is recognized, and starts up the program. The printing apparatus controls the carriage motor, line-feed motor and ink discharge and executes the printing of developed image data sent to it in successive fashion.

In accordance with this embodiment, as described above, only the basic software for controlling the power supply of the printing apparatus and communication and the code identifying the type of printing apparatus need be stored in the storage device of the printing apparatus. The printing apparatus need only have a memory large enough to store the minimum necessary software selected based upon the combination of ink cartridge type and printing method. This means that it will suffice if the printing apparatus has a small storage capacity. One result is a reduction in the cost of the printing apparatus. Moreover, if spare identification codes for identifying ink cartridges of a plurality of new types are prepared beforehand, then a printing method suited to a new type of ink cartridge can be supported without physically replacing the storage device with which the printing apparatus comes equipped. This makes it possible to improve the functionality of the printing apparatus in simple fashion.

Though not specifically described in the first and second embodiments, the information transferred from the host computer to the printing apparatus includes print data and non-print data (combination information, processing programs, etc.), wherein the non-print data has a header provided with a special control command that makes it possible to sense that the data is not print data. In a case where the amount of information in the non-print data has a suitable length, the end of the non-print data can be discriminated by transferring this length of information.

Further, it is described in the embodiments that a processing program that has been downloaded from the host computer is stored in a RAM. However, it is preferred that the memory be a writable non-volatile memory (e.g., a flash memory or an EEPROM), by way of example. In such case the previous program will be retained in memory even when the power supply is turned off. When printing of the same type is performed, therefore, the printing can be carried out without downloading the processing program again.

Further, it is described in the embodiments that image data is transferred as print data from the host computer 102 to the printing apparatus. However, the data transferred may include character codes or the like. In such case font data for generating character fonts on the side of the printing apparatus would be downloaded from the host computer or a font ROM would be provided in the printing apparatus beforehand. In a configuration in which an ink cartridge is combined with a printing head and the spacing (resolution) of nozzles mounted on printing heads differs for each cartridge, it is better to create character patterns having different numbers of dots using a single type of font data. It is preferred, therefore, that the printing apparatus be provided with a ROM in which scalable font data has been stored. Outline fonts or the like may be used as scalable fonts.

A third embodiment of the present invention will now be described.

In accordance with the second embodiment, a program to be downloaded is specified by the user. If the user forgets to specify such downloading, however, printing cannot be carried out.

Figure 12:
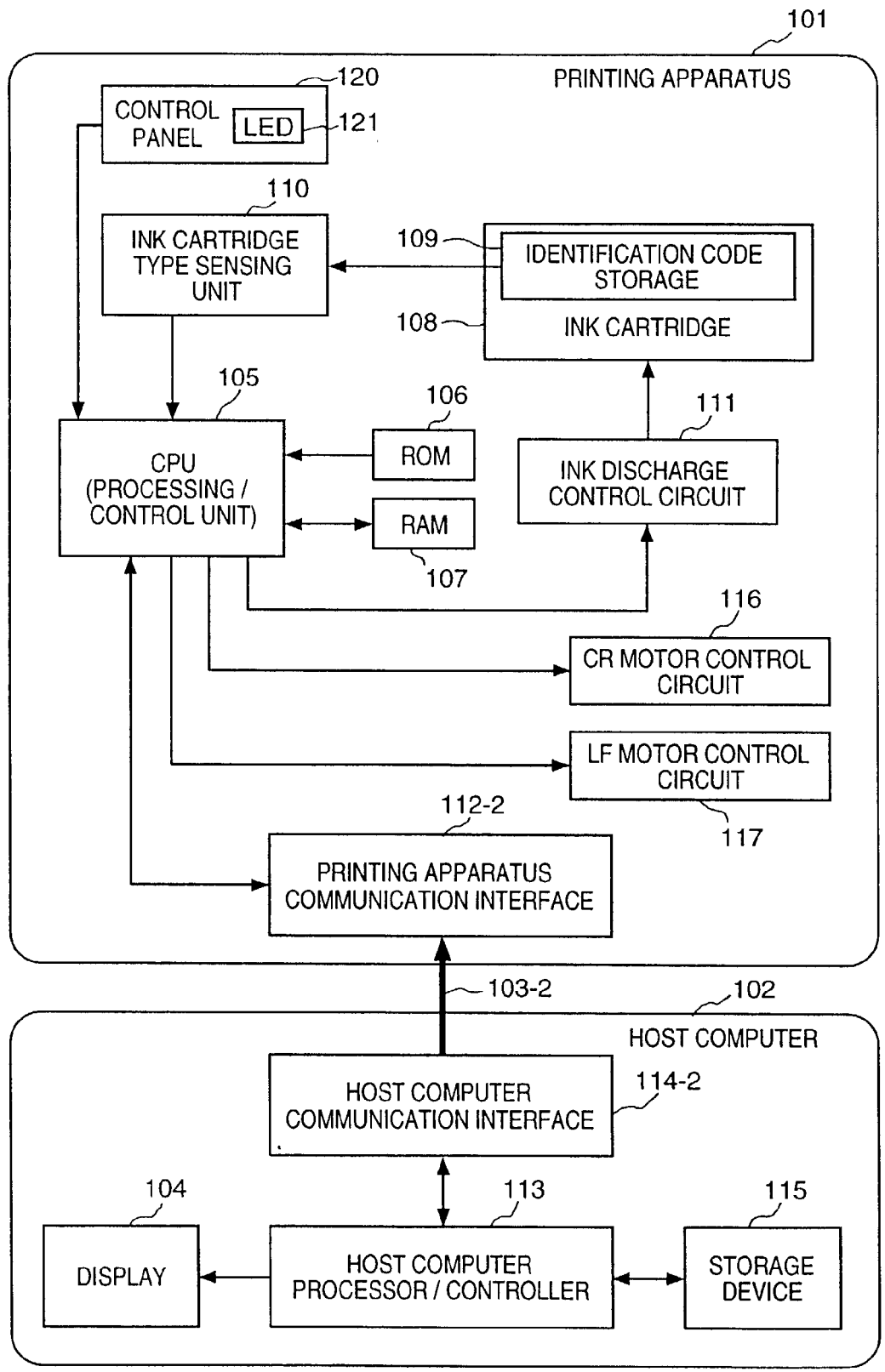
FIG. 12 is a block diagram of a printing system according to a third embodiment of the present invention.

Accordingly, as shown in FIG. 12, a control panel 120 provided on the printing apparatus 101 is equipped with an LED 121 which indicates whether a program for printing processing exists in the printing apparatus. If a program has not been downloaded, the LED 121 is lit to notify the user of the fact that printing cannot be performed. Other alarm means such as a buzzer may be provided and activated when a program is not present in the printing apparatus.

A fourth embodiment of the present invention will now be described.

The first embodiment relates to an example in which an ink cartridge is mounted on the carriage of a printing apparatus. However, in a case where the printing apparatus according to this embodiment has been connected to a host computer by an interface capable of bidirectional communication, it is possible to make the printing apparatus function as an image scanner by mounting an image scanner cartridge, which reads the image on a document, on the carriage.

Figure 14A:
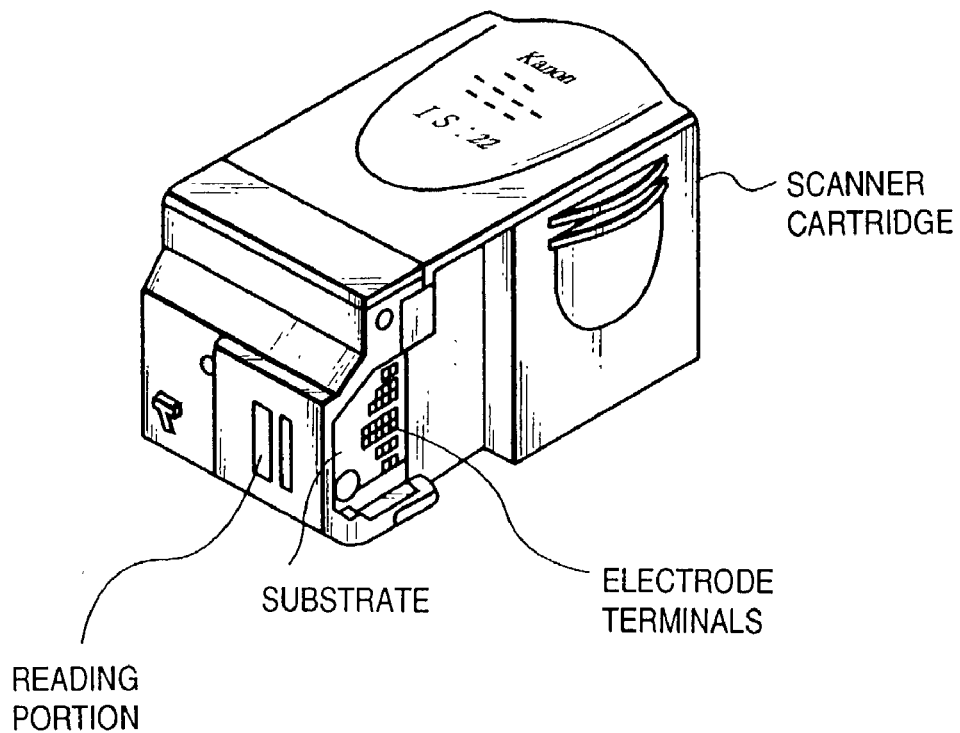
FIGS. 14A, 14B are perspective views illustrating a scanner cartridge and an ink cartridge, respectively, according to a fourth embodiment of the present invention.
Figure 14B:
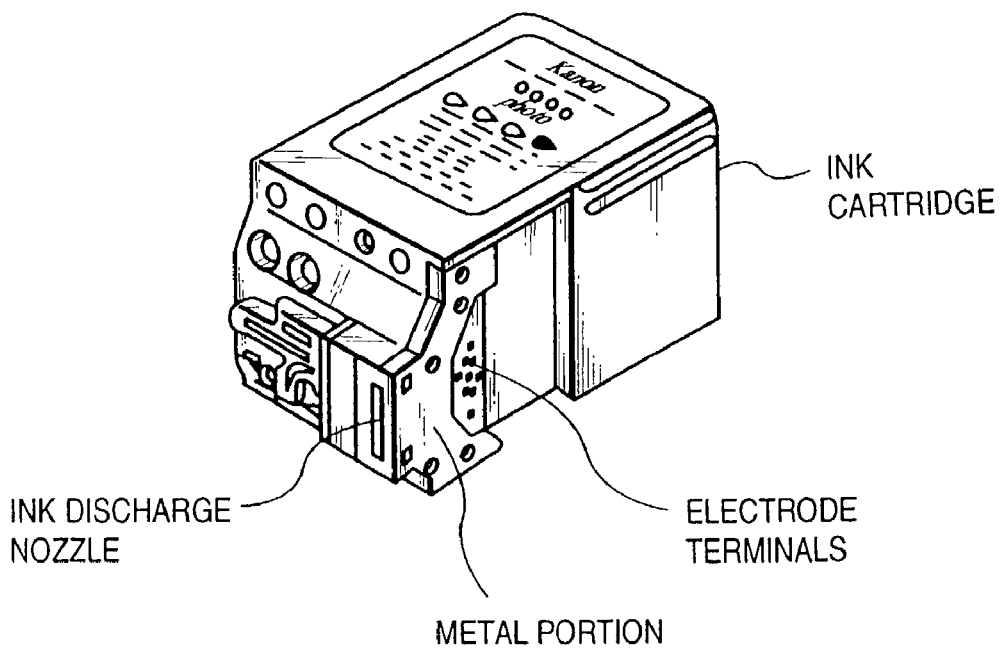

FIG. 14A is a perspective view showing a scanner cartridge for optically reading a document according to the fourth embodiment, and FIG. 14B is a perspective view showing an ink cartridge according to the fourth embodiment. Each cartridge is provided with a board having a plurality of electrode terminals which send and receive various signals. Several of the electrode terminals are used to indicate the type of cartridge in a manner similar to that of the first embodiment. For example, if the scanner cartridge has been mounted on the carriage, then identification information obtained from the scanner cartridge is reported to the host computer. In accordance with the identification information reported, the host computer transfers a program for implementing the functions of an image scanner to the erstwhile "printing apparatus", which now has been made to function as an image scanner. The host computer then issues a read command of the generally known type. The scanner (the former printing apparatus now functions as the scanner) operates in accordance with a downloaded program. That is, the scanner reads a document by causing the carriage to move back and forth relative to a set document in a manner similar to that at the time of a printing operation.

In order to prepare for a time in the future when a new type of cartridge is developed and mounted on the carriage, the carriage is provided with several reserved electrode terminals for cartridge identification. This is the same as the arrangements of the first through third embodiments. However, in a case where an identifying bar code, for example, has been affixed to a cartridge, optical reading means should be adopted as the ink-cartridge type sensing unit 110. This would be apparent to one having skill in the art.

That the array of nozzles of an ink cartridge differs depending upon the type of cartridge has already been explained. Through two types of nozzle arrays are illustrated in FIGS. 11A and 11B, the nozzle arrays are in no way limited to those illustrated. In order to make possible faster printing even with a monochrome cartridge, nozzles arrayed in two or more longitudinally rows can be provided. As a result, the printing of an image will distributed among the plural nozzle arrays. If the driving period for any one nozzle is kept the same (though a time interval of a certain duration must be provided), it will be possible to print an image by moving the carriage back and forth at twice the speed or more. Further, in the case of a color image, printing quality is improved by performing printing using four colors, i.e., by using the color black along with the usual three colors of yellow, magenta and cyan. The reason for this is that though mixing the colors yellow, magenta and cyan results in black theoretically, true black is difficult to obtain. Accordingly, a head having four color components and the corresponding ink tanks may be mounted on a single ink cartridge.

The types of ink cartridges available are not limited to those mentioned above. That is, available ink cartridges include a photographic cartridge containing ink having a density that is lower than usual for reproducing an image quality equivalent to that of a silver-chloride photograph by scanning the same line a plurality of times to perform printing, and an ink cartridge of multiple-drop type having a plurality of heater boards that cause ink to foam in order to modulate the size of discharged ink droplets. There is also the possibility that new types of cartridges will be developed in the future through technological innovation. Even if such novel cartridges are designed, merely providing the necessary programs to a user so that the user may register the programs in his or her own personal computer will make it possible for the user to employ cartridges of the latest type. It will also be possible for the printing apparatus of the embodiments to be reborn as printers exhibiting renovated functionality.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In the first through fourth embodiments, processing executed by the host computer is important and the host computer, which is represented generally by a personal computer, is supplied with a printer driver so that printing can be carried out.

It is obvious that processing on the side of the host computer may be implemented by software, namely by the printer driver.

Further, in a case where a new type of ink-jet cartridge capable of being mounted on the printing apparatus 101 of this embodiment is developed, it is of course necessary to download a program specific to this cartridge to the printing apparatus. In other words, it is necessary to register this program in the host computer.

In this case, a prescribed utility program is started up to display a program registration dialog box of the kind shown in FIG. 13. A printing medium such as a floppy disk storing the desired processing program is inserted into the host computer to make possible the registration of the program.

It is obvious that the present invention can be implemented by externally supplying the above-mentioned utility program, the printer driver and the program for the printing apparatus.

In this case, the program codes read from the storage medium implement the functions according to the embodiment, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Thus, in accordance with the present invention, as described above, there is provided a readily expandable printing apparatus capable of being applied to a number of types of printing processing through use of a small memory capacity.

As many apparently widely different embodiments of the present invention can be made without departing from the spirit and scope thereof, it is to be understood that the invention is not limited to the specific embodiments thereof except as defined in the appended claims.

What is claimed is:

1. A peripheral apparatus connected to a host apparatus, comprising:
   a transmission unit adapted to transmit part information and program identification information identifying a program installed in a memory to the host apparatus, the part information being related to a physical part attached to the peripheral apparatus;
   a reception unit adapted to receive program information sent from the host apparatus, which determines whether or not a proper program for controlling the physical part is installed in the memory, based on the part information and the program identification information, and sends the program information if the proper program for controlling the physical part is not installed;
   a storage unit adapted to store received program information into the memory; and
   a controller adapted to control the peripheral apparatus including the physical part by executing the program installed in the memory.

2. The peripheral apparatus according to claim 1, further comprising a print unit arranged to execute a printing process in accordance with program information stored in said storage unit.

3. The peripheral apparatus according to claim 2, wherein said transmission unit transfers the part information to the host apparatus when the host apparatus starts printing.

4. The peripheral apparatus according to claim 1, wherein the physical part includes a print head.

5. The peripheral apparatus according to claim 1,
   wherein the physical part includes either a print head or an image scanning head, and
   wherein the program information includes either printing program information or image scanning program information.

6. A method of utilizing a peripheral apparatus connected to a host apparatus, said method comprising:
   transmitting part information and program identification information identifying a program installed in a memory to the host apparatus, the part information being related to a physical part attached to the peripheral apparatus;
   receiving program information sent from the host apparatus, which determines whether or not a proper program for controlling the physical part is installed in the memory, based on the part information and the program identification information, and sends the program information;
   storing received program information in a storage unit into the memory; and
   controlling the peripheral apparatus including the physical part by executing the program installed in the memory.

7. The method according to claim 6, further comprising the step of executing a printing process in accordance with program information stored in the storage unit.

8. The method according to claim 7, wherein said transmitting step unit transfers the part information to the host apparatus when the host apparatus starts printing.

9. The method according to claim 6, wherein the physical part includes a print head.

10. The method according to claim 6,
    wherein the physical part includes either a print head or an image scanning head, and
    wherein the program information includes either printing program information or image scanning program information.

11. A computer readable storage medium storing a computer-readable program for implementing a method of utilizing a peripheral apparatus connected to a host apparatus, wherein the program comprises code for the steps of:
    transmitting part information and program identification information identifying a program installed in a memory to the host apparatus, the part information being related to a physical part attached to the peripheral apparatus;
    receiving program information sent from the host apparatus, which determines whether or not a proper program for controlling the physical part is installed in the memory, based on the part information and the program identification information, and sends the program information;
    storing received program information in a storage unit into the memory; and
    controlling the peripheral apparatus including the physical part by executing the program installed in the memory.

12. The storage medium according claim 11, wherein the program further comprises code for executing a printing process in accordance with program information stored in the storage unit.

13. The storage medium according to claim 12, wherein the transmitting step unit transfers the part information to the host apparatus when the host apparatus starts printing.

14. The storage medium according to claim 11, wherein the physical part includes a print head.

15. The storage medium according to claim 11,
    wherein the physical part includes either a print head or an image scanning head, and
    wherein the program information includes either printing program information or image scanning program information.

* * * * *

UNITED STATES PATENT AND TRADEMARK OFFICE
CERTIFICATE OF CORRECTION

PATENT NO. : 7,130,065 B2
APPLICATION NO. : 10/215031
DATED : October 31, 2006
INVENTOR(S) : Tetsushi Kohno It is certified that error appears in the above-identified patent and that said Letters Patent is hereby corrected as shown below:

TITLE PAGE:
Item (57) ABSTRACT
Line 9, "later" should read -- latter --.

DRAWINGS:
Sheet 10, Figure 11B, "(MAZENTA)" should read -- (MAGENTA) --.

COLUMN 1:
Line 7, "1998" should read -- 1998, --.

COLUMN 5:
Line 23, "received" should read -- received program --.

COLUMN 9:
Line 31, "Through" should read -- Though --.

COLUMN 12:
Line 18, "computer readable" should read -- computer-readable --.

Signed and Sealed this

Twelfth Day of June, 2007

JON W. DUDAS
*Director of the United States Patent and Trademark Office*